Oct. 2, 1956 G. HERZOG 2,765,410

DETERMINATION OF FLUID LEVELS

Filed Oct. 16, 1951

INVENTOR.
GERHARD HERZOG
BY Daniel Stryker
J. H. Graham
ATTORNEYS

United States Patent Office 2,765,410

Patented Oct. 2, 1956

2,765,410

DETERMINATION OF FLUID LEVELS

Gerhard Herzog, Houston, Tex., assignor to The Texas Company, New York, N. Y., a corporation of Delaware Application October 16, 1951, Serial No. 251,581

3 Claims. (Cl. 250—43.5)

This invention relates to the determination of levels of liquids or fluid substances which behave like liquids, in a container, tank or other vessel by radioactive detecting means.

It contemplates employing a source of penetrative radiation rigidly supported within the container, at least one section or portion of the source being positioned substantially above the fluid level and another section or portion thereof being positioned substantially below the liquid level in the container. Preferably the source comprises an elongated vertical member with a substantially continuous distribution of radioactivity along its length, as will be described later in more detail. Advantageously, the relative strengths or densities of the source material at succeeding points along its length are at least approximately proportional to the square of the distance of the respective points from the radiation detector.

The radiation detector is advantageously mounted at or on the top of the container substantially in alignment with the vertical axis of the radiation source, and is coupled with detecting or recording means responsive to its output for indicating or recording the position of the fluid level within the container, tank or other vessel. The detector may be mounted within the upper section of the vessel above the highest point reached by the fluid level, though usually it is preferable to mount it outside the tank.

A feature of the invention involves having one element or section of the source placed within the vessel below the lowest liquid level and having it project in a more or less continuous vertical line upwardly through the interior of the vessel so as to obtain a linear relationship between the intensity of the radiation passing to a detector and the liquid level height in the vessel.

The invention is useful for determining and controlling the level of fluid in a closed container, tank or treating vessel such as employed in petroleum refineries as, for example, vessels used in the catalytic alkylation or other treatment of hydrocarbons. It is also useful for measuring the height of solid particulate catalysts within hoppers or reaction zones, such as used, for example, in the cracking of hydrocarbons with "fluidized" solid catalysts. In short, the invention is useful in determining and controlling the level of a fluid in any closed container wherein the position of the fluid level varies over wide ranges of more than one or two feet, for example, and wherein mechanical indicating means would operate with considerable difficulty.

In my co-pending application, Serial No. 155,257, filed April 11, 1950, for "Liquid Level Measuring Apparatus," now Patent No. 2,714,167, granted July 26, 1955, an arrangement is disclosed in which a radioactive source is lowered or raised inside a container, and opposite to it on the outside, a radiation detector is mounted and moved simultaneously with the source. When the radiation beam is above the fluid level, the intensity of radiation at the detector is higher than when the fluid is interposed and thus absorbs radiation. Provision is made so that the source and detector are continuously moved mechanically to a position where the beam is just coincident with or tangential to the then existing fluid level, and this height is recorded. This arrangement involves a considerable amount of mechanical linkages which are not required when using the present invention.

It has also been proposed heretofore to provide a float in which is sealed a source of radiation, the float being of sufficient buoyancy to rest on the surface of the liquid. The position of the float is determined by detecting means located outside the vessel wall. However with this arrangement it is necessary to provide a suitable guide means within the vessel so as to guide the movement of the float. Moreover, the buoyancy of the float must be adjusted, depending upon the density of the liquid within the vessel.

Another method of determining the fluid level consists in inserting in the tank at a position which is below the lowest fluid level to be expected, a single fixed source of radiation. Above the highest point which the fluid level may reach a radiation detector is mounted, this detector being either on the inside or the outside of the tank. Another version of this idea is where the detector is placed below the lowest level of the fluid or beneath the tank, and the source is arranged above the highest level the fluid ever reaches within the tank. The two arrangements operate very similarly. However, as will now be shown by reference to the drawing, the employment of a single radiation source in such manner is of limited application.

The nature of the invention, however, will best be understood when described in connection with the accompanying drawings, in which.

Figure 1:
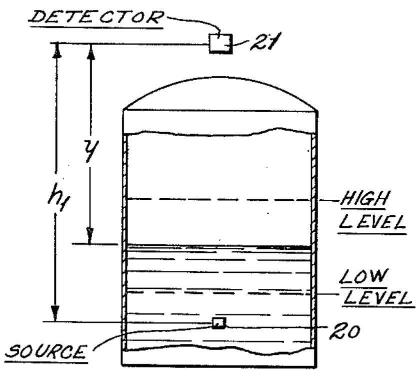
Fig. 1 illustrates diagrammatically a tank partially filled with a fluid.

Figure 1 of the accompanying drawing illustrates diagrammatically a tank partially filled with water or a fluid of approximate density 1.0, having a source of gamma radiation 20 rigidly supported within the liquid body below the lowest fluid level expected. A radiation detector 21 is positioned at the top of the tank a vertical distance $h_1$ above the source 20, and a vertical distance $y$ above the liquid level of the water. The intensity of radiation at the detector depends upon the value of $y$ according to the following equation:

$$I = I_0 e^{-\mu(h_1 - y)} \qquad (1)$$

where $I_0$ is the intensity, with the tank empty and as measured by the detector at its fixed position, $e$ is the base for Naperian logarithms, and $\mu$ is the radiation absorption coefficient for water in which case $$\frac{1}{\mu} = 17 \text{ centimeters}$$

Figure 2:
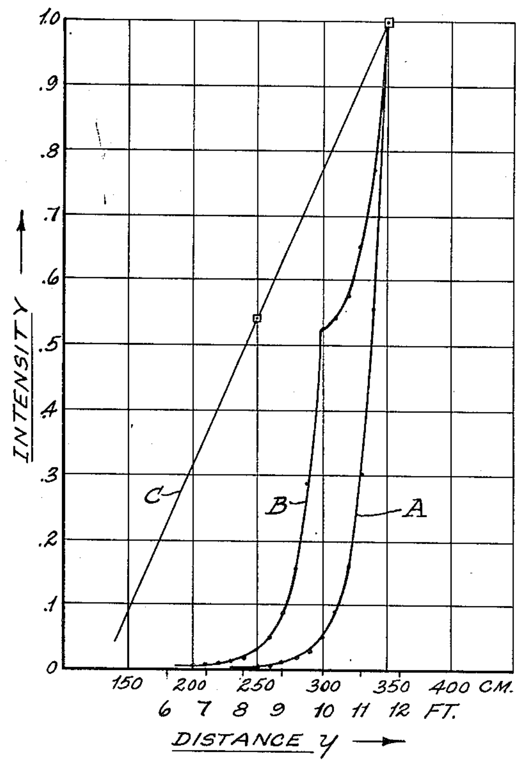
Fig. 2 is a graphical evolution.

A graphical evaluation of Equation 1 is shown as curve A in Figure 2 of the drawing. The ordinate in Figure 2 represents relative radiation intensity, and the abscissa represents distance $y$ between the detector and the liquid level within the tank. The distance $h_1$ is taken as 350 centimeters, or approximately 11½ feet. The curve is normalized in such a way that the intensity at the counter is taken as 1.0 when the fluid level is exactly at the position of the source.

For a rise in fluid level the intensity falls off rapidly, and at a distance $y=10$ feet, it is only 5% of the original intensity. In other words, when the fluid covers the source with a layer of 1.5 feet of water, the intensity has dropped to 5%. For the next two feet the intensity drops furthermore to a very small percentage. Consequently, an observation of the intensity with the detector for cases where the fluid thickness is more than one or two feet does not permit an accurate determination of the fluid level. In other words, the arrangement as shown in Figure 1 is useful only for changes in fluid level of the order of one or two feet if the fluid has a density of 1. If the density of the fluid is lower, the range will be somewhat larger; if it is higher, then the effective range will still be smaller.

Figure 3:
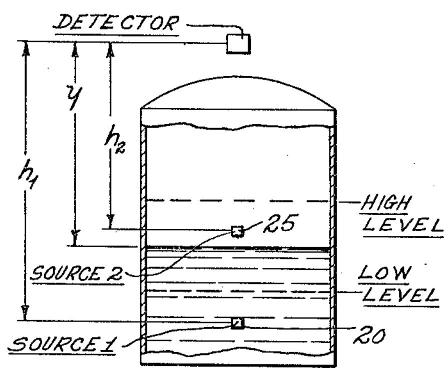
Fig. 3 shows diagrammatically a tank partially filled with a fluid and a secondary source of radiation.

I have found that the range of usability of such a device can be improved if a secondary stationary source is inserted in the tank, as shown in Figure 3. In Figure 3 the source 20 is at a distance $h_1$ from the detector, and the second source 25 is at a distance $h_2$. The relationship between intensity at the detector and the fluid level depends furthermore on the ratio of the strength of the two sources. The relative strength of each source is therefore made proportionate to the square of its distance from the detector. This relationship is represented by the following equation where $Q_1$ and $Q_2$ represent the quantity of radioactivity for each of the respective sources:

$$\frac{Q_1}{h_1^2}=\frac{Q_2}{h_2^2} \tag{2}$$

Curve B in Figure 2 shows the relationship between intensity and fluid level for the two sources where $h_1=11.5$ feet, and $h_2=10$ feet. This curve can be calculated from the following equations wherein $k$ is a constant which depends on various geometrical factors such as size and efficiency of the detector, thickness of the walls of the vessel, etc.:

$$\text{(3) (a)} \quad I=k\{Q_1e^{-\mu(h_1-y)}+Q_2\}$$

where $h_1$ is greater than $y$ and $y$ is greater than $h_2$.

$$\text{(b)} \quad I=k\{Q_1e^{-\mu(h_1-y)}+Q_2e^{-\mu(h_2-y)}\}$$

where $y$ is less than $h_2$.

The intensity at the detector can be called $I_0$ when the fluid level is coincidental with the source 20. Its value can be derived from the Equation 3 (*a*) by setting $y=h_1$, thereby obtaining the following equation:

$$I_0=k\{Q_1+Q_2\} \tag{4}$$

By combining Equations 2, 3 and 4, the following equations are obtained:

$$\text{(5) (a)} \quad \frac{I}{I_0}=\frac{e^{-\mu(h_1-y)}+\left(\frac{h_2}{h_1}\right)^2}{1+\left(\frac{h_2}{h_1}\right)^2}$$

where $h_1$ is greater than $y$ and $y$ is greater than $h_2$.

$$\text{(b)} \quad \frac{I}{I_0}=\frac{e^{-\mu(h_1-y)}+\left(\frac{h_2}{h_1}\right)^2e^{-\mu(h_2-y)}}{1+\left(\frac{h_2}{h_1}\right)^2}$$

where $y$ is less than $h_2$.

From the relationships of Equations 5 (*a*) and 5 (*b*) it is possible to derive curve B in Figure 2. This curve shows that with two sources of radiation wider variations in the fluid level may be tolerated than is the case with a single radiation source. Thus, starting with a fluid level at the first source 20 and increasing the fluid level, the intensity falls off rapidly and tends to flatten out at the location of the second source 25. This point is represented by the break in the curve where $y=10$ feet. From there on the second source 25 takes over and extends the range considerably. In short, with two sources as illustrated in this arrangement, the permissible fluid level change in the case of water is of the order of about three to four feet.

Figure 4:
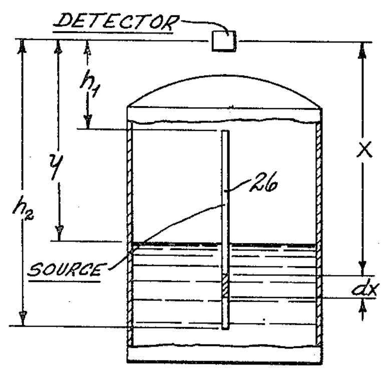
Fig. 4 illustrates diagrammatically a tank partially filled with a fluid and an elongated source member with substantially continuous distribution of radioactivity along its length.

By providing an elongated source member with substantially continuous distribution of radioactivity along its length a more linear relationship between the intensity at the detector and the height of the fluid level is secured. Thus, as shown in Figure 4, the linear continuous source extends from a distance $h_1$ to a distance $h_2$ from the detector. The fluid level is shown at a distance $y$ from the detector. The linear source 26 can be made up in such a way that the amount of radioactivity along its length may change in any desired way. If the amount of radioactivity per unit length of the source is designated as some quantity $q$, then $q$ will in general be a function of the distance $x$ between the detector and an element or section of the source which is located at the distance $x$ from the detector. Such an element is designated in Figure 4 below the fluid level by the term $dx$. The contribution from the element $dx$ to the intensity at the detector is represented by the following equation:

$$dI=kq(x)\frac{1}{x^2}dxe^{-\mu(x-y)} \tag{7}$$

wherein $k$ is a constant which depends upon various geometrical factors, $q$ is the amount of radioactivity per unit of length of source at the distance $x$ from the detector, and the factor $$\frac{1}{x^2}$$

compensates for the inverse square law. The intensity is proportionate to the strength of the element $dx$ of source which is being considered. The exponential factor $e^{-\mu(x-y)}$ takes care of the absorption of radiation emanating from the volume element of the source and passing through a thickness $(x-y)$ of the fluid.

A similar equation, 8, can be written when the volume element of the source is above the fluid level where no absorption occurs, the absorption of radiation in the air or gas above the fluid being neglected. The total intensity at the detector from the full length of the source is then given by the integrals of the following equation:

$$I=k\int_{x=y}^{x=h_2}\frac{q(x)}{x^2}e^{-\mu(x-y)}dx+k\int_{x=h_1}^{x=y}\frac{q(x)}{x^2}dx \tag{9}$$

The radioactivity along the source should vary with the distance $x$ in such a way that the resulting curve for the intensity versus the distance $y$ is linear.

If the term $$\frac{q(x)}{x^2}$$

be taken as equal to $c$ and $c$ then substituted for this term in Equation 9, then the following equation results:

$$I=ck\int_{x=y}^{x=h_2}e^{-\mu(x-y)}dx+ck\int_{x=h_1}^{x=y}dx \tag{11}$$

Integrating Equation 11 gives the following equation:

$$I=ck\left\{\frac{1-e^{-\mu(h_2-y)}}{\mu}+y-h_1\right\} \tag{12}$$

For purposes of normalization, the intensity corresponding to the lowest fluid level of a value $y_0$ can be called $I_0$ so that Equation 12 becomes:

$$I_0=ck\left\{\frac{1-e^{-\mu(h_2-y_0)}}{\mu}+y_0-h_1\right\} \tag{13}$$

Dividing Equation 12 by Equation 13, the following equation is obtained:

$$\frac{I}{I_0}=\frac{1+\mu(y-h_1)-e^{-\mu(h_2-y)}}{1+\mu(y_0-h_1)-e^{-\mu(h_2-y_0)}} \tag{14}$$

This automatically makes the intensity equal to unity when the fluid level is at its lowest point corresponding to $y_0$. Curve C in Figure 2 represents the situation when employing an elongated continuous source in which the density of radioactive material varies directly as the square from the distance of the detector, and wherein $h_1=150$, $h_2=400$, and $y_0=350$ centimeters. The curve shows the linear relationship for the intensity in its dependence on the fluid level over a range of eight feet. Accordingly, any change in the height of the fluid level can be covered by such an arrangement and in substantially linear relationship, provided suitable values for $h_1$, $h_2$ and $y_0$ are used.

If other than linear relationships are preferred, suitable distribution functions, i. e., $q(x)$, can be chosen.

Figure 5:
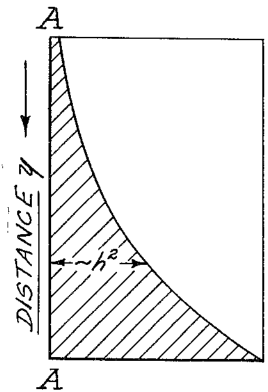
Fig. 5 is a curve showing the distribution of radioactivity from an elongated source.

An elongated radiation source with suitable distribution of radioactivity can be made up in different ways. One would be to use a sheet or membrane of radioactive material. As shown in Figure 5, this sheet can be cut along a curve which "cancels" the inverse square law. The shaded portion of the sheet can then be rolled up along the ordinate AA to form a rod or small cylinder. Another method involves rotating a rod in a lathe, for example, while spraying with a radioactive paint sprayed from a spray gun mounted on a tool holder of the lathe and moving along the rod with a velocity corresponding to the desired distribution ratio. A still further method of approximating the desired continuous distribution of radioactivity is to form the rod or elongated element from a plurality of small individual sources each of increasing radiation strength.

The distribution function, i. e., $q(x)$, is desirably of monatonic increasing nature or character; that is, a function which continuously increases with increasing values of $x$. Thus these functions may be exponential i. e., parabolic, hyperbolic, etc., in character. The term "monatonic increasing" is defined in the text "Mathematics Dictionary" by James, and published by the Digest Press, 1943 (Revised Edition).

While the previous description illustrates the elongated source as being in rod-like form, it is contemplated that it may be used in the form of a plane area, such as a sheet of the desired or selected geometrical shape, such sheet being formed of radioactive material or formed of a non-radioactive material coated with radioactive material. The source can be a geometric solid of the selected form such as a solid of revolution generated by revolving a plane area about a line or axis corresponding to the axis of detection in the vessel. The source may comprise a shell of the desired geometric form filled with or containing radioactive material such as crushed radioactive ore.

Although the drawing shows a detector mounted at the top of the vessel in alignment with the axis of a rod-like source, it is possible that the detector may occupy other positions and that the source may also be disposed other than in a vertical position. Conceivably the detector (suitably enclosed) may be mounted within the vessel and may be placed either inside or outside the vessel at some elevation corresponding to the mid-point, for example, of an elongated source. For example, the source may approximate in form two conical or triangular elements disposed along their common axis with their apices opposing, the detector being located in the vicinity of the opposing or connecting apices.

In lieu of a source of gamma radiation (for example, radium), it is contemplated that other types of penetrative radiation may be used. For example, a neutron source may be used such as a mixture of radium and beryllium.

Any suitable radiation detector may be employed for example, an effective detector is disclosed in U. S. Patent No. 2,397,071, granted to D. G. C. Hare, March 19, 1946.

Obviously many modifications and variations of the invention as hereinbefore set forth may be made without departing from the spirit and scope thereof and, therefore, only such limitations should be imposed as are indicated in the appended claims.

I claim:

1. An apparatus for determining the level of a fluid in a container which comprises an elongated source of penetrative radiation rigidly supported within the container, a radiation detector disposed in alignment with said source, said source having a substantially continuous distribution of radioactivity along its length with the relative strengths of elements of the source at succeeding points along its length being at least approximately proportional to the square of the distance of the respective points from the detector and means responsive to the output of said detector for indicating the position of the fluid level within the container.

2. An apparatus for determining the level of a fluid in a container which comprises a source of penetrative radiation rigidly supported within the container, the vertical dimension of said source being at least as long as the anticipated travel of said liquid level, a radiation detector disposed in substantial vertical alignment with said source, said source having a substantially continuous distribution of radioactivity along its length, the relative strengths of elements of the source at succeeding points along its length being at least approximately proportional to the square of the distance of the respective points from the detector and means responsive to the output of said detector for indicating the position of the fluid level within the container.

3. A device according to claim 2 in which the source is a geometric shell, the interior of which contains a radioactive material.

References Cited in the file of this patent

UNITED STATES PATENTS

| | | |
|---|---|---|
| 2,323,128 | Hare | June 29, 1943 |
| 2,456,233 | Wolf | Dec. 14, 1948 |
| 2,479,882 | Wallhausen et al. | Aug. 23, 1949 |
| 2,501,560 | Blau | Mar. 21, 1950 |
| 2,506,585 | Elliott | May 9, 1950 |
| 2,674,695 | Grace | Apr. 6, 1954 |

OTHER REFERENCES

Development of Wide Range Radiation Type Level Control etc., Grace et al., Instruments, vol. 23, pp. 1074–6. October 1950.